United States Patent
Jain et al.

(10) Patent No.: US 9,031,056 B2
(45) Date of Patent: May 12, 2015

(54) WIRELESS COMMUNICATION APPARATUS AND METHOD

(71) Applicants: Sachin Jain, New Delhi (IN); Somvir Dahiya, Noida (IN); Arvind Garg, Noida (IN); Arvind Kaushik, Ghaziabad (IN); Arindam Sinha, Noida (IN)

(72) Inventors: Sachin Jain, New Delhi (IN); Somvir Dahiya, Noida (IN); Arvind Garg, Noida (IN); Arvind Kaushik, Ghaziabad (IN); Arindam Sinha, Noida (IN)

(73) Assignee: Freescale Semiconductor, Inc., Austin, TX (US)

( * ) Notice: Subject to any disclaimer, the term of this patent is extended or adjusted under 35 U.S.C. 154(b) by 156 days.

(21) Appl. No.: 13/938,239

(22) Filed: Jul. 10, 2013

(65) Prior Publication Data
US 2015/0016444 A1   Jan. 15, 2015

(51) Int. Cl.
*H04J 3/16* (2006.01)
*H04W 56/00* (2009.01)

(52) U.S. Cl.
CPC .................................. *H04W 56/001* (2013.01)

(58) Field of Classification Search
CPC ...... H04W 84/08; H04W 56/00; H04L 12/56; H04J 3/0638
USPC ......... 370/350, 503, 506, 509, 510, 512, 535, 370/310, 277, 389, 412, 413, 470, 471, 352, 370/451, 324
See application file for complete search history.

(56) References Cited

U.S. PATENT DOCUMENTS

| 6,788,707 B1 * | 9/2004 | Horton et al. ................. 370/474 |
| 8,130,729 B2 | 3/2012 | Hara |
| 2010/0130147 A1 * | 5/2010 | Kanda et al. .................. 455/138 |

* cited by examiner

*Primary Examiner* — Chi H Pham
*Assistant Examiner* — Alexander O Boakye
(74) *Attorney, Agent, or Firm* — Charles Bergere

(57) ABSTRACT

A transmission node for use in a wireless communication network includes a first register for storing a set of first mask bits, a second register for storing a set of second mask bits, and a mask switching block for multiplexing the set of first mask bits and the set of second mask bits and outputting the set of third mask bits. The transmission node further includes a CPRI unit with an auxiliary interface for receiving the set of third mask bits. An activation block is connected between the CPRI unit and the mask switching block for causing the mask switching block to output the set of second mask bits based on data in a current frame in the CPRI unit.

16 Claims, 4 Drawing Sheets

WIRELESS COMMUNICATION APPARATUS AND METHOD

BACKGROUND OF THE INVENTION

The present invention relates to wireless communication systems and, more particularly, to a method for providing selectivity for remote or local reset as well as link status information propagation for nodes connected in a daisy chain via Common Public Radio Interface (CPRI).

CPRI is an industry standard aimed at defining a specification for the interface of base stations between Radio Equipment Controllers (REC) and Radio Equipment (RE). FIG. 1 shows a topology of a chain 100 including several nodes 102a-102e connected via the CPRI interface. Node 102a is a REC node, node 102e is a RE node, and nodes 102b-102d can be either a REC node or a RE node. As shown in node 102C, in order to support a CPRI daisy chain configuration, each node has a pair of CPRI units 104 connected through their auxiliary interfaces 106. The chain 100 can be located in one transmission node, e.g., an eNodeB or a relay node, or across more than one transmission node.

Link status information 108 like Loss of Signal (LOS), Loss of Frame (LOF) and other Layer 1 alarms such as Remote Alarm Indication (RAI) and Service Access Point (SAP) Defect Indication (SDI), are transmitted from one node to another in a point to point fashion. On the other hand, a Reset request 110 originated from the REC node 102a, or any intermediate node in the chain 100, which is the node 102b in this case, is propagated across the chain 100 in other than a point to point fashion. The local node 102c, on receiving the Reset request 110 from the previous adjacent node in the chain 100, should propagate the Reset request 110 to the next node 102d in the chain 100.

FIG. 2 is a schematic diagram illustrating the frame hierarchy and notation indices in the CPRI protocol. As illustrated in FIG. 2, a basic frame has 16 words, indexed with W=0 . . . 15; 256 time division multiplexed basic frames, indexed with X=0 . . . 255, form a hyperframe; and 150 hyperframes, indexed with Z=0 . . . 149, for a radio frame. The radio frame is a frame to be transmitted and received over a radio area (cell or sector) provided by a RE node or a REC node. The duration of a basic frame is about 260.4 ns.

As mentioned above, a basic frame has 16 words, W=0 . . . 15. The word at index W=0 is used for a control word, and the remaining words (W=1 . . . 15) are dedicated to the U-plane In-Phase and Quadrature (IQ) data transport (IQ data block). The length of the control word depends on the CPRI link rate. In the basic frame, each byte (8 bits) within a word is addressed with an index Y. Therefore, at the minimum CPRI link rate of 614.4 Mb/s, Y=0, which means that there are 128 bits in a basic frame, out of which 8 bits are for the control word and the remaining 120 bits are IQ data bits, while at the maximum CPRI link rate of 9830.4 Mb/s, Y=0 . . . 15, which means that there are a total of 2048 bits in a basic frame, out of which 128 bits are for the control word and the remaining 1920 bits are IQ data bits.

According to the CPRI protocol, the Reset request 110 and the link status information 108 are transmitted through bits 0 to 4 of the control word of the basic frame #Z.130 of each hyperframe. When an RE or an REC receives a valid Reset request 110, it should reset itself and forward the Reset request 110 by setting the lowest bit of the basic frame #Z.130 in downlink for at least 10 hyperframes, and acknowledge the reception of a valid Reset request 110 through a Reset ACK 112 by setting the lowest bit of the basic frame #Z.130 in uplink for at least 5 hyperframes on the same link. The link status information 108, such as RAI, SDI, LOS and LOF carried in bits 1 to 4 of the control word of the basic frame #Z.130, should be generated locally and transmitted to the next node in the chain.

FIG. 3 shows a conventional RE/REC node 300. In order to control the source of the 2048 bits of the basic frame, a set of 2048 software programmable mask bits is stored in a mask register 302 in the RE/REC node 300 and provided to a first CPRI unit 304a through the auxiliary interface 306a of the first CPRI unit 304a. If a mask bit is programmed to '0', the data corresponding to it is generated locally and sent to the next CPRI unit in the chain 100. If the mask bit is programmed to '1', the data bit received from the previous CPRI unit is forwarded to the next CPRI unit in the chain 100. There is only one set of 2048 mask bits for all 256 basic frames in a hyperframe. As illustrated in the node 102c (FIG. 1), like the mask register 302, there is another mask register (not shown) for storing a set of 2048 software programmable mask bits to be provided to a second CPRI unit 304b through a second auxiliary interface 306b of the second CPRI unit 304b.

In order to provide selectivity for remote or local reset as well as link status information propagation for all nodes connected in a daisy chain via CPRI, software in the node 300 should be able to program the mask register 302 appropriately after transmission of the control word of the previous basic frame #Z.129 and before the transmission of the basic frame 2.130 begins. Since the duration of a basic frame is 260.4 ns, this poses a large overhead on the software, that is, to be able to change the mask value within 260.4 ns. Further, it is very difficult for the software to maintain sync with the data transmission occurring on the link, i.e., the software must determine precisely when the basic frame #Z.130 will be transmitted over a link so that it can appropriately program the mask register 302 at the start of the basic frame #Z.130. In addition, if the software of a particular RE/REC node is unresponsive, the reset request 110 may not be forwarded beyond that node. This may prevent the communication system from recovering from a system hung state, which may even require manually resetting the system nodes 102.

It is therefore desirable to reduce the software overhead in forwarding the Reset request to a next node and at the same time transmitting the link status information in point to point fashion, and to make the RE/REC node able to forward the reset request to the next node if the RE/REC node becomes unresponsive.

BRIEF DESCRIPTION OF THE DRAWINGS

The invention, together with objects and advantages thereof, may best be understood by reference to the following description of preferred embodiments together with the accompanying drawings in which.

DETAILED DESCRIPTION OF PREFERRED EMBODIMENTS

Figure 1:
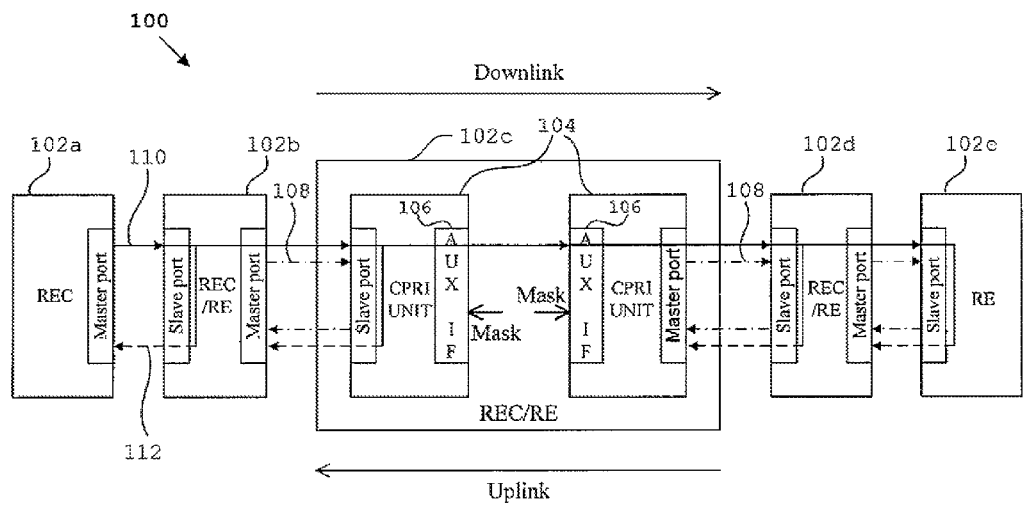
FIG. 1 is a schematic block diagram showing a topology of a chain including several nodes connected via CPRI interface.
Figure 2:
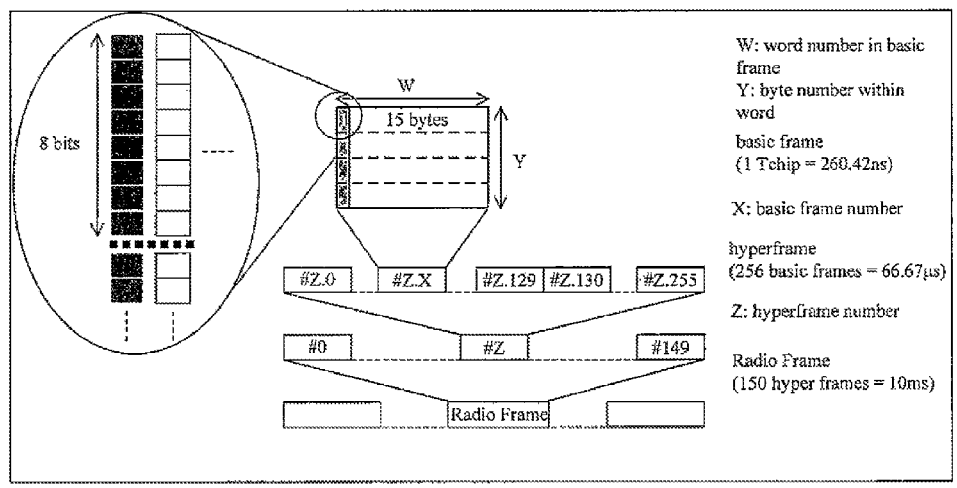
FIG. 2 shows the frame hierarchy and notation indices for the CPRI protocol.
Figure 3:
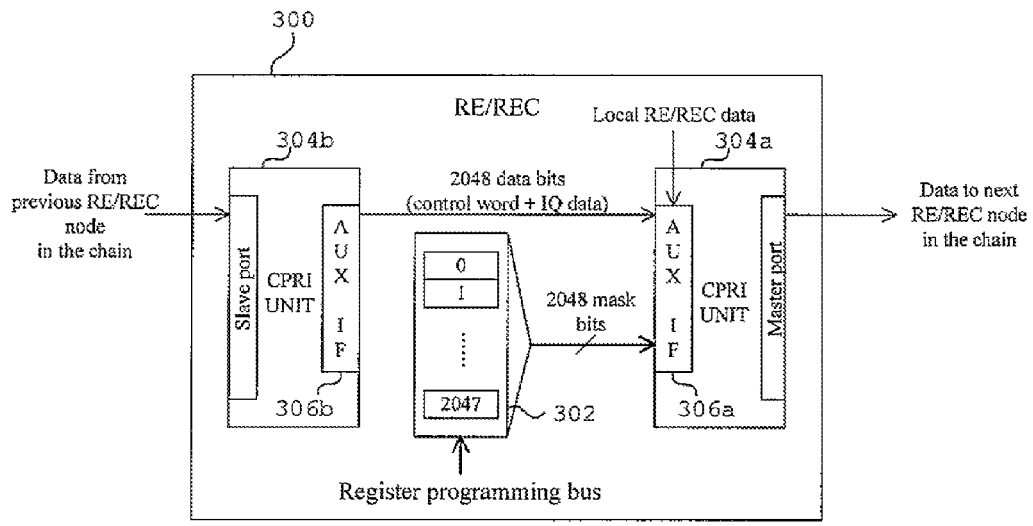
FIG. 3 is a schematic block diagram of a conventional RE/REC node.

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the spirit and scope of the invention. In the drawings, like numerals are used to indicate like elements throughout. Furthermore, the terms "comprises," "comprising," or any other variation thereof, are intended to cover a non-exclusive inclusion, such that module, circuit, device components, structures and method steps that have a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

In one embodiment, the present invention provides a transmission node for use in a wireless communication network. The transmission node includes a first register for storing a set of first mask bits, a second register for storing a set of second mask bits, and a mask switching block connected to the first and second registers for multiplexing the sets of first and second mask bits and outputting a set of third mask bits. The transmission node further includes a CPRI unit with an auxiliary interface for receiving the set of third mask bits, and an activation block connected between the CPRI unit and the mask switching block for instructing the mask switching block to output the set of second mask bits based on data in a current frame in the CPRI unit.

In another embodiment, the present invention provides a method of operating a transmission node being for use in a wireless communication network. The method includes storing a set of first mask bits in a first register, storing a set of second mask bits in a second register, and multiplexing the set of first mask bits and the set of second mask bits with a mask switching block to provide a set of third mask bits. The set of third mask bits is one of the set of first mask bits or the set of second mask bits. The method further includes capturing data in a current frame in a CPRI unit and instructing the mask switching block to output the set of second mask bits to an auxiliary interface of the CPRI unit based on the captured data in the current frame in the CPRI unit.

Figure 4:
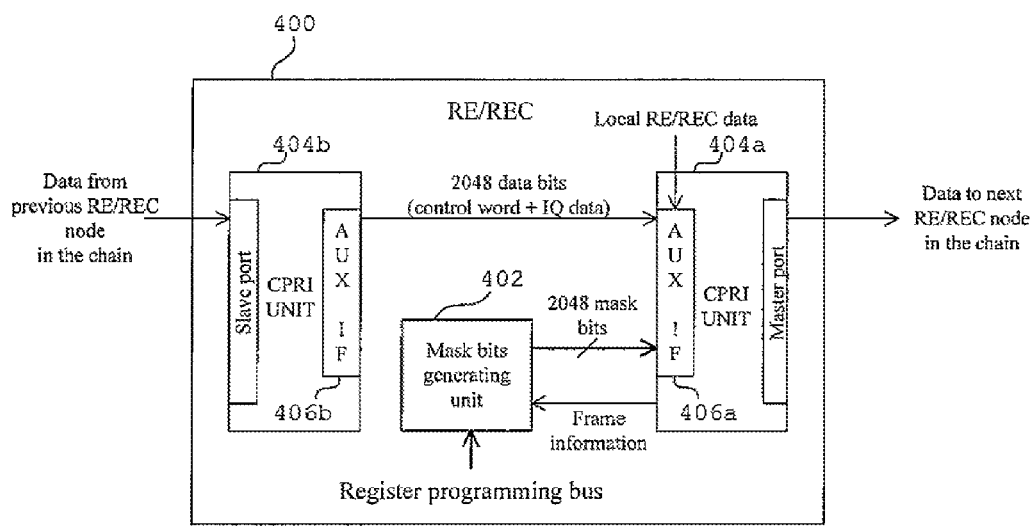
FIG. 4 is a schematic block diagram of a RE/REC node in accordance with an embodiment of the invention.

Referring now to FIG. 4, in a RE/REC node 400 in accordance with an embodiment of the invention, a mask bits generating unit 402 is provided to provide a set of 2048 mask bits to a first CPRI unit 404a through the first auxiliary interface 406a of the first CPRI unit 404a based on frame information provided from the first CPRI unit 404a. The mask bit generating unit 402 is provided so that the mask bits for the Reset request 110 and the link status 108 carried in the control word of the basic frame #Z.130 will be generated in a more efficient way. As illustrated in the REC/RE 102c in FIG. 1, there are two mask bits generating units, with the second one providing another set of 2048 mask bits to a second CPRI unit 404b (FIG. 4) through a second auxiliary interface 406b of the second CPRI unit 404b.

Figure 5:
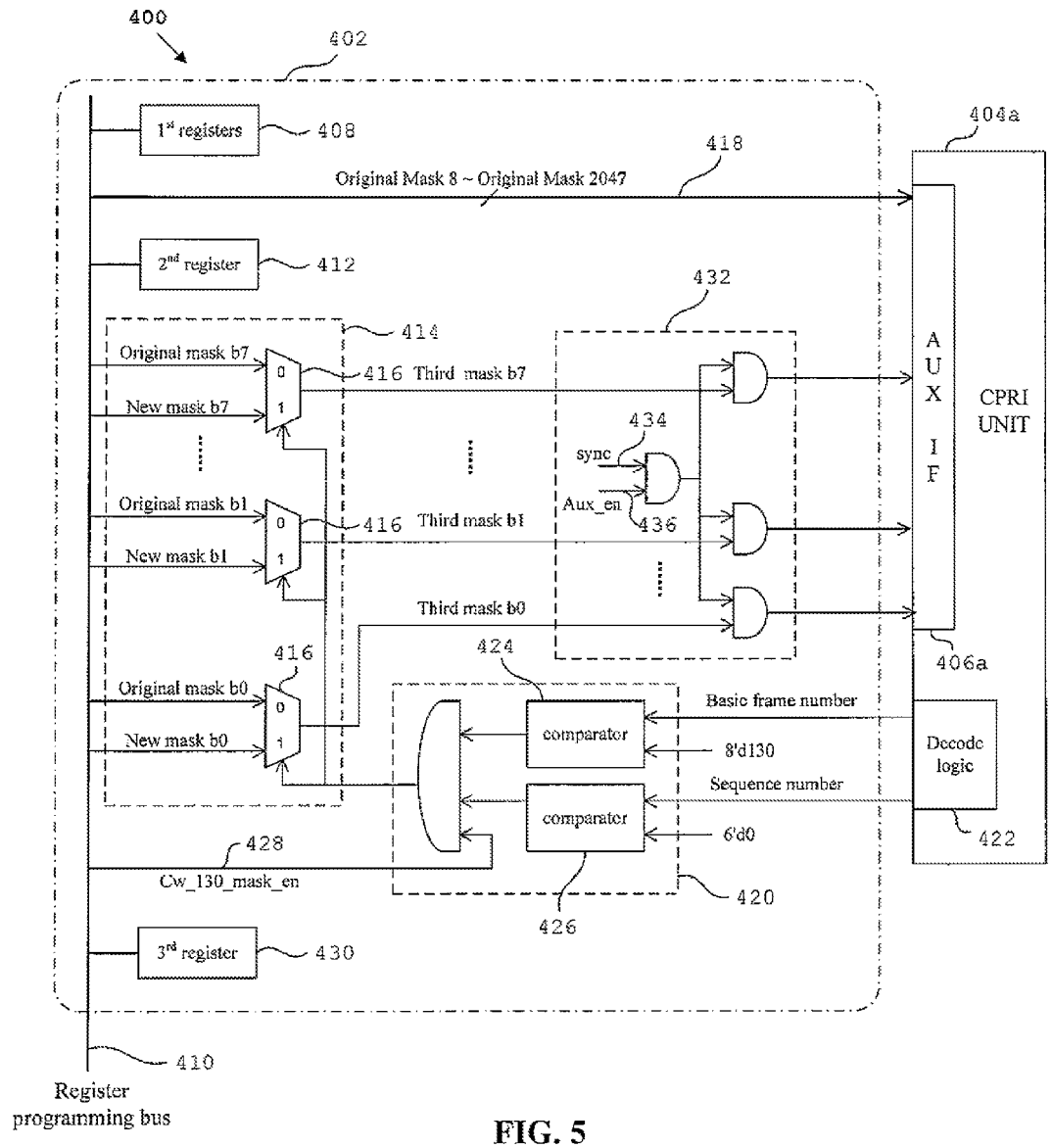
FIG. 5 is a schematic block diagram of a detailed structure of the mask bits generating unit of the RE/REC node of FIG. 4 in accordance with an embodiment of the invention.

FIG. 5 is a more detailed schematic block diagram of the mask bits generating unit 402 of the RE/REC node 400 in accordance with an embodiment of the invention. It is noted that the RE/REC node 400 is located in a transmission node, such as an eNodeB or a relay node.

A set of 2048 original mask bits are stored in a plurality of first registers 408 in the RE/REC node 400 that can be accessed by way of a register programming bus 410. For example, 64 32-bit registers are used here for implementing 2048 mask bits. The first registers 408 can be a part of a memory of the node, e.g., ROM, RAM or flash memory. In addition, a set of 8 new mask bits are stored in a second register 412 in the RE/REC node 400 that can also be accessed by way of the register programming bus 410. As for the mask bits for the basic frame #Z.130, as discussed above, only the lowest 5 mask bits of the set of 8 new mask bits are needed. To propagate the Reset request 110, the lowest new mask bit for the Reset request 110 is set as '1', and to locally generator the link status information 108 such as RAI, SDI, LOS and LOF, the rest 4 new mask bits of the lowest 5 new mask bits are set as '0'. The extra three new mask bits can be marked as reserved and will be ignored by the receivers or may be used in future if required. The second register 412 can be a part of a memory of the node, e.g., ROM, RAM or flash memory.

A mask switching block 414 is connected to one of the first registers 408 that stores the lowest 8 original mask bits of the set of 2048 original mask bits, and the second register 412 to get the lowest 8 original mask bits and the 8 new mask bits. The set of 8 original mask bits and the set of 8 new mask bits are preferably provided to the mask switching block 414 by way of the register programming bus 410. The mask switching block 414 multiplexes the set of 8 original mask bits and the set of 8 new mask bits, and outputs 8 third mask bits, which are to be provided to the first CPRI unit 404a through the first auxiliary interface 406a of the first CPRI unit 404a. The set of 8 third mask bits is alternatively the set of 8 original mask bits or the set of 8 new mask bits. In a preferred embodiment, the mask switching block 414 includes eight multiplexers 416 to switch between the set of 8 original mask bits and the set of 8 new mask bits. The rest 2040 mask bits 418 of the 2048 first mask bits are directly provided to the first CPRI unit 404a through the first auxiliary interface 406a. The first CPRI unit 404a transmits the 2048 data bits including 128-bit control word and 1920-bit IQ data in the current basic frame to a next CPRI unit in the chain 100 based on the set of 8 third mask bits and the rest 2040 mask bits 418.

An activation block 420 is connected between the first CPRI unit 404a and the mask switching block 414 for instructing the mask switching block 414 to output the set of 8 new mask bits based on data in a current basic frame in the first CPRI unit 404a. The data includes a basic frame number of the current basic frame and a sequence number of a current sequence in the current basic frame. For example, a sequence may have 32 bits, and the data in a basic frame is transmitted in chunks of 32 bits which are referred with a sequence number. Therefore, for the minimum link rate of 614.4 Mb/s, there are 4 sequences with sequence numbers 0-3 in a basic frame, and for the maximum link rate of 9830.4 Mb/s, there are 64 sequences with sequence numbers 0-63 in a basic frame. The basic frame number of the current basic frame and the sequence number of the current sequence in the current basic frame are decoded by a decode logic 422 in the first CPRI unit 404a and provided to the activation block 420.

In a preferred embodiment, the activation block 420 comprises a first comparator 424 for detecting a frame with a predetermined frame number and a second comparator 426 for detecting a sequence with a predetermined sequence number in the current frame. In order to detect the start of the basic frame #Z.130, the first comparator 424 compares the basic frame number of the current basic frame with 8'd130 to detect the basic frame #Z.130, and the second comparator 426 compares the sequence number of the current sequence in the current basic frame with 6'd0 to detect the start of the basic frame.

Only when the first sequence of the basic frame #Z.130 is detected, an activating signal will be provided by the activation block 420 to the mask switching block 414 to instruct the mask switching block 414 to output the set of 8 new mask bits. Therefore, since the lowest new mask bit for the Reset request 110 is set as '1', and the rest 4 new mask bits of the lowest 5 new mask bits for the link status information 108 such as RAI, SDI, LOS and LOF are set as '0', when the start of the basic frame 2.130 is detected by the activation block 420, the Reset request 110 in the control word of the basic frame #Z.130 will be propagate to the next CPRI unit in the chain 100, and the link status information 108 such as RAI, SDI, LOS and LOF in the basic frame #Z.130 will be generated locally and transmitted to the next CPRI unit in the chain 100.

In a preferred embodiment, a feature enabling signal 428 stored in a third register 430 in the RE/REC node 400 is provided to the activation block 420 by way of the register programming bus 410, and joined with the output of the first and second comparators 424 and 426 to instruct the mask switching block 414 to output the set of 8 new mask bits.

In another preferred embodiment of the present invention, the mask bits generating unit 402 of the RE/REC node 400 further includes a synchronization block 432 connected between the mask switching block 414 and the first auxiliary interface 406a for providing the set of 8 third mask bits output from the mask switching block 414 to the first CPRI unit 404a synchronously with a synchronization signal 434. The synchronization signal 434 can be provided by the previous CPRI unit in the chain 100 (FIG. 1) or an internal clock of the current RE/REC node 400.

In a further preferred embodiment, the set of 8 third mask bits is provided to the first CPRI unit 404a when the first auxiliary interface 406a is enabled according to an auxiliary interface enabling signal 436. The auxiliary interface enabling signal 436 can be provided by a register of the RE/REC node 400 bit indicating that the first auxiliary interface 406a is enabled.

Figure 6:
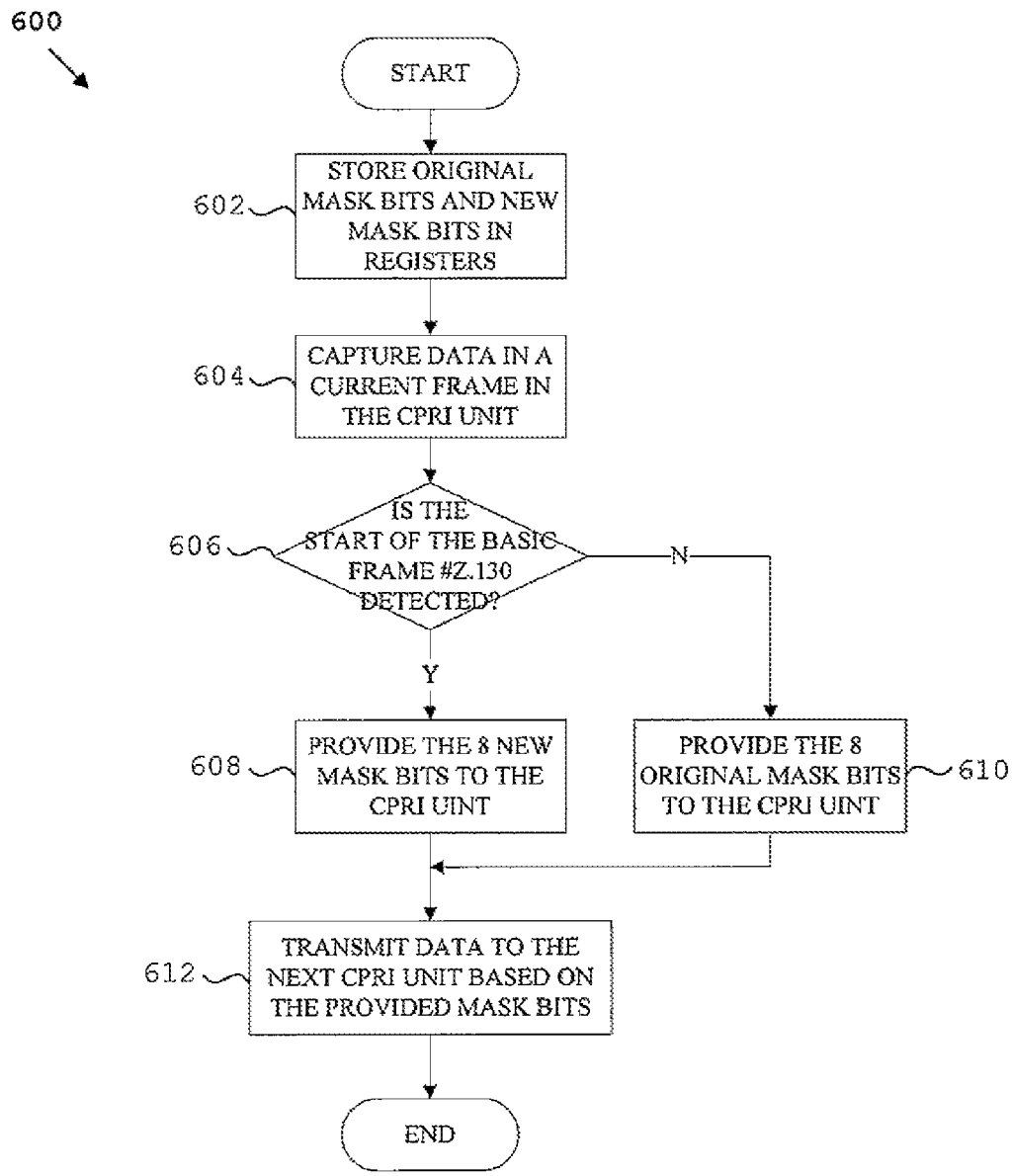
FIG. 6 is a flow chart illustrating a method of providing selectivity for remote or local reset as well as link status information propagation for RE/REC nodes connected in a chain via a CPRI unit in accordance with an embodiment of the present invention.

FIG. 6 is a flow chart illustrating a method 600 of providing selectivity for remote or local reset as well as link status information propagation for RE/REC nodes connected in a chain via CPRI unit in accordance with an embodiment of the present invention.

The method 600 starts at step 602 by storing original mask bits and new mask bits in registers.

In more detail, a set of 2048 original mask bits are stored in a plurality of first registers 408 (FIG. 5) in the RE/REC node 400 that are preferably accessed by way of a register programming bus 410 (FIG. 5). For example, 64 32-bit registers are used here for implementing 2048 mask bits. In addition, a set of 8 new mask bits are stored in a second register 412 (FIG. 5) in the RE/REC node 400 that can also be accessed by way of the register programming bus 410. As for the mask bits for the basic frame #Z.130, as discussed above, only the lowest 5 mask bits of the set of 8 new mask bits are needed. To propagate the Reset request 110, the lowest new mask bit for the Reset request 110 is set as '1', and to locally generator the link status information 108 such as RAI, SDI, LOS and LOF, the rest 4 new mask bits of the lowest 5 new mask bits are set as '0'. The extra three new mask bits can be marked as reserved and will be ignored by the receivers or may be used in future if required. The lowest 8 original mask bits of the set of 2048 original mask bits and the set of 8 new mask bits are multiplexed so that one of the two sets will be alternatively provided to the CPRI unit as a set of third mask bits.

At step 604, data in a current frame in the CPRI unit is captured to detect the start of the basic frame #Z.130. In a preferred embodiment, the data includes a basic frame number of the current basic frame and a sequence number of the current sequence in the current basic frame. For example, a sequence may have 32 bits, and the data in a basic frame is transmitted in chunks of 32 bits which are referred with a sequence number. Therefore, for the minimum link rate of 614.4 Mb/s, there are 4 sequences with sequence numbers 0-3 in a basic frame, and for the maximum link rate of 9830.4 Mb/s, there are 64 sequences with sequence numbers 0-63 in a basic frame. The basic frame number of the current basic frame is decoded and compared with 8'd130 to detect the basic frame #Z.130. The sequence number of the current sequence in the current basic frame is decoded and compared with 6'd0 to detect the start of the basic frame.

At step 606, if the start of the basic frame #Z.130 is detected, moving to step 608. Therefore, the set of 8 new mask bits will be provided to the CPRI unit through an auxiliary interface of the CPRI unit. Otherwise, the lowest 8 original mask bits of the set of 2048 original mask bits will be provided to the CPRI unit through the auxiliary interface of the CPRI unit as shown in step 610. In a preferred embodiment, eight multiplexers are used to switch between the set of 8 original mask bits and the set of 8 new mask bits.

At step 612, the data in the current basic frame is transmitted from the CPRI unit to the next CPRI unit in the chain 100 (FIG. 1) based on the set of third mask bits.

Therefore, since the lowest new mask bit for the Reset request 110 is set as '1', and the rest 4 new mask bits of the lowest 5 new mask bits for the link status information 108 such as RAI, SDI, LOS and LOF are set as '0', when the start of the basic frame #Z.130 is detected, the Reset request 110 in the control word of the basic frame #Z.130 will be propagate to the next CPRI unit in the chain 100, and the link status information 108 such as RAI, SDI, LOS and LOF in the basic frame 2.130 will be generated locally and transmitted to the next CPRI unit in the chain 100.

In a further preferred embodiment, a feature enabling signal is used to enable providing the set of 8 new mask bits to the CPRI unit.

In another preferred embodiment, the set of third mask bits is synchronized with a synchronization signal before being provided to the CPRI unit.

In a further preferred embodiment, the set of third mask bits is provided to the auxiliary interface when the auxiliary interface is enabled.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A transmission node for use in a wireless communication network, comprising:
   a first register for storing a set of first mask bits;

a second register for storing a set of second mask bits;

a mask switching block connected to the first register and the second register for multiplexing the set of first mask bits and the set of second mask bits and outputting a set of third mask bits;

a CPRI unit comprising an auxiliary interface for receiving the set of third mask bits;

an activation block connected between the CPRI unit and the mask switching block for instructing the mask switching block to output the set of second mask bits based on data in a current frame in the CPRI unit; and a synchronization block connected between the mask switching block and the auxiliary interface for providing the set of third mask bits output from the mask switching block to the auxiliary interface synchronously with a synchronization signal.

2. The transmission node of claim 1, wherein the sets of first and second mask bits are provided to the mask switching block by way of a register programming bus.

3. The transmission node of claim 1, wherein the mask switching block comprises a plurality of multiplexers to switch between the set of first mask bits and the set of second mask bits.

4. The transmission node of claim 1, wherein the activation block comprises:

a first comparator for detecting a frame with a predetermined frame number; and a second comparator for detecting a sequence with a predetermined sequence number in the frame, wherein the activation block instructs the mask switching block to output the set of second mask bits when the sequence with a predetermined sequence number in the frame with a predetermined frame number is detected.

5. The transmission node of claim 1, wherein instructing the mask switching block to output the set of second mask bits further depends on a feature enabling signal.

6. The transmission node of claim 5, further comprising a third register in the transmission node for storing the feature enable signal, wherein the feature enable signal is provided to the third register by way of a register programming bus.

7. The transmission node of claim 1, wherein the set of third mask bits is provided to the auxiliary interface when the auxiliary interface is enabled.

8. The transmission node of claim 1, wherein the CPRI unit transmits the data in the current frame in the CPRI unit in a transmission chain to a next CPRI unit in the transmission chain based on the set of third mask bits.

9. A method of operating a transmission node for use in a wireless communication network, comprising:

storing a set of first mask bits in a first register;

storing a set of second mask bits in a second register;

multiplexing the set of first mask bits and the set of second mask bits with a mask switching block to provide a set of third mask bits, wherein the set of third mask bits is one of the set of first mask bits or the set of second mask bits;

capturing data in a current frame in a CPRI unit;

instructing the mask switching block to output the set of second mask bits to an auxiliary interface of the CPRI unit based on the captured data in the current frame in the CPRI unit; and synchronizing the set of third mask bits provided by the mask switching block with a synchronization signal prior to providing the set of third mask bits to the auxiliary interface of the CPRI unit.

10. The method of claim 9, wherein the sets of first and second mask bits are provided to the mask switching block by way of a register programming bus.

11. The method of claim 9, wherein the mask switching block comprises a plurality of multiplexers to switch between the set of first mask bits and the set of second mask bits.

12. The method of claim 9, wherein instructing the mask switching block to output the set of second mask bits to an auxiliary interface of the CPRI unit based on the captured data in the current frame in the CPRI unit includes detecting a frame with a predetermined frame number and a sequence with a predetermined sequence number in the frame, and instructing the mask switching block to output the set of second mask bits when the sequence with a predetermined sequence number in the frame with a predetermined frame number is detected.

13. The method of claim 9, wherein activating the mask switching block to output the set of second mask bits further depends on a feature enabling signal.

14. The method of claim 13, wherein the feature enabling signal is stored in a third register in the transmission node and is provided by way of a register programming bus.

15. The method of claim 9, wherein the set of third mask bits is provided to the auxiliary interface when the auxiliary interface is enabled.

16. The method of claim 9, further comprising transmitting the data in the current frame to another CPRI unit based on the set of third mask bits.

* * * * *